May 13, 1930.  W. F. H. BRAUN  1,758,497
LAWN MOWER
Filed Dec. 11, 1923    2 Sheets-Sheet 1

WITNESS:
Rob² R. Kitchel

INVENTOR
William F. H. Braun
BY
Augustus B Stoughton
ATTORNEY

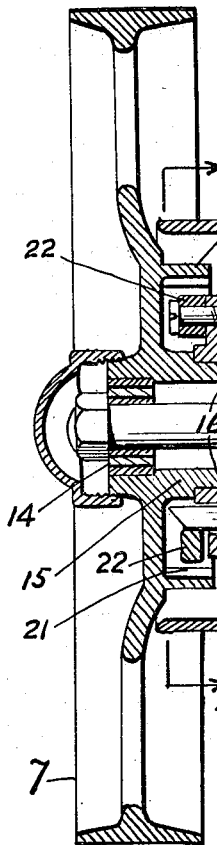
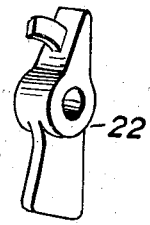
FIG.7.
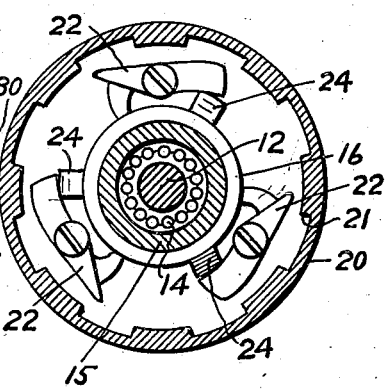
FIG.3.   FIG.4.
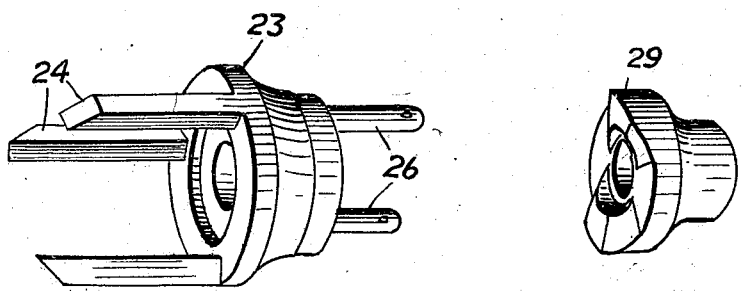
FIG.5.   FIG.6.
INVENTOR
William F. H. Braun
BY
Augustus B Stoughton
ATTORNEY.
WITNESS:
Rob't P Kitchel.

Patented May 13, 1930

1,758,497

UNITED STATES PATENT OFFICE

WILLIAM F. H. BRAUN, OF PHILADELPHIA, PENNSYLVANIA

LAWN MOWER

Application filed December 11, 1923. Serial No. 679,905.

In lawn mowers, more particularly of the so-called gang variety, it is customary to tilt the units collectively or individually in order to lift their cutters clear of the ground and in order to put them in mowing position.

The principal object of the present invention is to provide for automatically putting the rotary cutters of the units out of rotation as and when the units are tilted to clear the cutters from the ground and into rotation as and when the units are lowered to put the cutters into mowing position. Another object of the invention is to provide simple, reliable, durable and efficient mechanism for accomplishing the purpose stated. Another object of the invention is to save the unnecessary expenditure of power and avoid the unnecessary wear and tear and noise incident to the rotation of the cutters when lifted out of mowing position.

To these and other ends hereinafter set forth the invention may be said to comprise a lawn mower in which there is a lawn mower unit and a support in respect to which the unit is tiltable into position for lifting its cutter clear of the ground and into position for cutting and which is provided with clutch mechanism interposed between the support and unit and automatically responsive to such tilting motion for putting the cutter out of rotation when clear of the ground and into rotation when in mowing position.

The invention further comprises the improvements to be presently described and finally claimed.

In the following description reference will be made to the accompanying drawings forming part hereof and in which Figure 1 is a sectional view taken on the line 1—1 of Fig. 2 and illustrating features of the invention.

Fig. 3 is a section taken on the line 3—3 of Fig. 2 and drawn to an enlarged scale with the crown cam 29 omitted.

Fig. 4 is a view taken on the line 4—4 of Fig. 3.

Figs. 5 and 6 are perspective views of elements constituting a clutch, and

Fig. 7 is a perspective view drawn to an enlarged scale of one of the pawls shown in Fig. 4.

Figure 1:
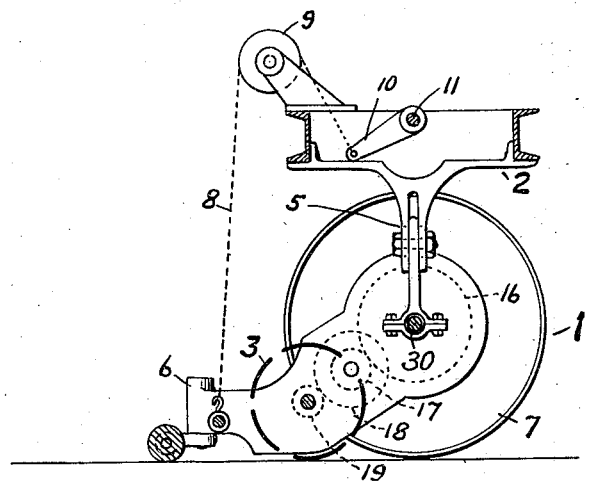
Figure 2:
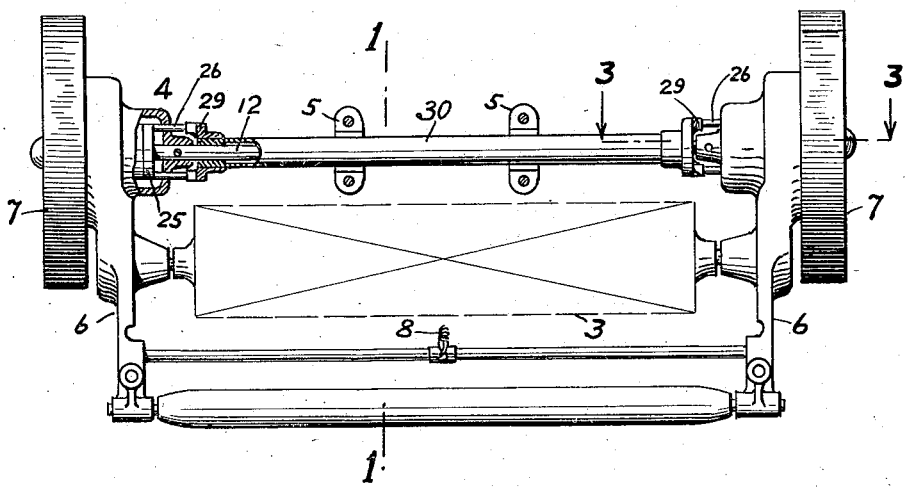
Fig. 2 is a top or plan view of Fig. 1 with parts broken away.

In the drawings 1, generally, is a lawn mower unit. 2, generally, is a support in respect to which the unit is tiltable into position for lifting its cutter 3 clear of the ground and into position for mowing, as shown in Fig. 1. There is clutch mechanism, generally indicated at 4, Fig. 2, interposed between the support 2 and the unit 1 and responsive to the tilting motion referred to for putting the cutter out of rotation when clear of the ground and into rotation when in mowing position. As shown the support 2 is an element or carriage to which a mower unit or units 1 is or are attached as shown by means of one or more connections, brackets or suspensions 5. In cases where several units are attached to the same support or carriage, the device is known as a gang lawn mower. Between the support 2 and the frame 6 of the lawn mower unit there are means for tilting the frame 6 about the axis of its ground wheels 7, and these means are shown to comprise a chain 8 passing over a pulley 9 and operated by an arm 10 on a shaft 11, which is under the control of the operator and is used to raise and lower the trailing or free end of the mower unit to put the cutter 3 into operative position in respect to the ground and to lift the cutter 3 clear of the ground. With the exception of the clutch mechanism mentioned above as generally indicated at 4, there is nothing new or particular about the parts described and they are representative of usual provisions which are present in different forms in well known and understood lawn mowers. The axle 12 is fast to the side portions of the frame 6. To emphasize this the pin 13 is shown in Fig. 3. On this axle 12 the ground wheel freely turns and in Fig. 3 antifriction bearings 14 are shown interposed between the two parts. Rotatively loose on the hub 15 of the ground wheel there is a gear wheel 16 which by a train of intermeshing gearing 17, 18 and 19, Fig. 1, dotted lines, drives the cutter 3. This train of intermeshing gearing is housed within the side frame 6. There is on the ground wheel a flange 20 having internal teeth 21, and on the gear wheel 16 are pawls 22 which automatically engage the teeth 21 when the ground wheels 7 are turned in forward direction and which automatically disengage the teeth when the ground wheels are turned in reverse direction, so that when the unit is traveling forward the cutter is in rotation, but when the unit is backed the cutter is out of rotation although in each case the cutter is in cutting position with respect to the ground. Having thus described what constitutes the pawl-and-ratchet transmission mechanism I will proceed with a description of the construction and operation in connection therewith of clutch mechanism embodying features of the invention. There is a clutch head 23 provided with fingers 24, one for each pawl 22, and these fingers 24 are adapted to be projected and retracted through the wheel 16, so that when projected, as shown in Figs. 3 and 4, they underlie the pawls and hold them out of action, thus disconnecting the transmission mechanism. When retracted these fingers clear the pawls, permitting them to engage the teeth 21 and thus connecting the transmission mechanism. The clutch head 23 is rotatable in respect to the clutch body 25, which body 25 is slidable on the axle 12 and is turnable with the frame 6, being connected therewith by pins 26, passing through openings in the frame 6 and having springs 27 tending to move the clutch head and body into position for causing the pins 24 to clear the pawls 22. The clutch head 23 while rotatably mounted on the clutch body is held against endwise movement in respect thereto by the washer or plate 28. 29 is a crown cam fast on a sleeve 30 rigidly secured to the support 2, or more accurately, to the brackets 5, and through which the shaft or axle 12 extends. At this point it may be repeated that the clutch body 25, by reason of the pins which pass through the holes in the frame 6, is angularly positioned on shaft 12 in accordance with the position in which the frame 6 is tilted in respect to the horizontal. The angular position of the crown cam may be regarded as substantially fixed because any movement out of vertical of the brackets 5 may be disregarded as being of negligible extent in comparison with the tilting movement of the mower unit and as being too small to operate to shift the fingers 24 endwise sufficiently to engage or disengage the pawls 22.

The mode of operation of the invention may be described as follows in connection with the embodiment of it chosen for illustration in the accompanying drawings:

Normally and while cutting grass the lawn mower unit and the support 2 are in the relative positions in which they are shown in Fig. 1, and the position of the frame 6 is such that the ends of the pins 26 are on low parts of crown cam 29, with the clutch element in extreme inward position such that its fingers 24 clear the pawls 22, thus the transmission mechanism is operative to turn the rotary cutter 3 when the mower unit is advanced and to permit the cutter to remain at rest when the mower unit is backed. Otherwise stated, under the conditions mentioned the transmission mechanism operate normally and so does the mower unit within the limits of tilting of the mower unit or of the support that occurs in cutting grass. However, when the free end of the lawn mower unit, which is the end that carries the cutter, is tilted up from the ground as by the operation of the shaft 11, the pins 26 by the relative turning of the frame 6 in respect to the crown cam 29 are brought onto a high part of the cam 29, with the result that the clutch element is shifted to its extreme outward position with the pins 24 in position for throwing or holding the pawls 22 out of action so that the transmission mechanism is disconnected and the cutter 3 remains at rest or out of rotation, in the present instance no matter whether the unit is moved forward or backward.

In other words, chain 8 lifts frame 6 turning cam 23 by means of pins 26 and body 25. Cam 29 remains relatively stationary. Pins 26 ride up on the high parts of cam 29 and are thereby forced to outward position (to the left in Figure 3). This movement of cam 23 places fingers 24 in contact with pawls 22 so that pawls 22 cannot engage teeth 21. From the foregoing description it will be evident that there is provided a lawn mower unit which, when tilted up from the ground, automatically disconnects the mechanism which turns the cutter so that the cutter remains at rest when the unit is in that position and is moved. The result of this is that unnecessary wear and tear, noise and expenditure of power are avoided. However, when the unit is in mowing position such tilting and rocking motions as occur do not operate to disconnect the transmission mechanism, so that in mowing, the unit is free to function in the customary and well understood manner as is also the support 2 which as has been said is usually a carriage with or without carrying wheels.

It will be obvious to those skilled in the art to which the invention relates that modifications may be made in details of construction, arrangement and matters of mere form without departing from the spirit of the invention which is not limited as to such matters or otherwise than as the prior art and the appended claims may require.

I claim:

1. In a lawn mower the combination of a lawn mower unit having a constant mesh cutter drive including pawl-and-ratchet connections, a support with respect to which the unit is tiltable into position for lifting its cutter clear of the ground and into position for mowing, and clutch mechanism interposed between the support and unit and responsive to such tilting motion and operative on the pawls of said connections for putting the cutter out of rotation when clear of the ground and into rotation when in mowing position.

2. In a lawn mower the combination of a mower unit including ground wheels and a frame mounted on the ground wheels and provided with a cutter and with pawl and ratchet transmission mechanism interposed between the wheels and cutter, a support to which the frame is pivotally connected at the axis of the ground wheels to permit tilting of the frame to raise and lower the cutter, a normally retracted clutch element carried by the frame and adapted to act on and to disconnect and to connect the pawl-and-ratchet transmission mechanism, and a crown cam connected with the support and of which the clutch element is the follower.

3. In a lawn mower the combination of a frame and an axle in fixed relation, ground wheels rotatable on the axle, pawl-and-ratchet transmission mechanism carried by the frame and operated by the ground wheels, a sleeve in which the axle is turnable to tilt the frame, a crown cam carried by the sleeve, and a cam follower clutch element carried by the frame concentrically with the sleeve and projected and retracted in respect to the pawl mechanism by the crown cam during the relative angular movement of the frame and sleeve.

4. In a lawn mower, a frame having pawl-and-ratchet transmission mechanism, a sleeve in respect to which the frame is turnable and which is provided with a crown cam, and a pawl clutch adapted to act on the pawls of said mechanism and carried for endwise movement in the frame and arranged concentrically of said sleeve and in operative relation with the cam by which it is projected and retracted in response to angular movement of the frame in respect to the sleeve.

5. In a lawn mower, a frame and sleeve adapted for relatively turning movement, pawl-and-ratchet transmission mechanism carried by the frame, and crown cam elements aligned with the axis of turning movement and of which one element is fast on the sleeve and of which the other element is slidable in the frame and projectable and retractable in respect to the pawls of the transmission mechanism.

6. In a lawn mower the combination of transmission mechanism including pawl-and-ratchet connections, a tiltable frame, a clutch head having pawl fingers adapted to act on the pawls and said head being rotatable with one element of the pawl-and-ratchet connection, a clutch body angularly movable with the frame and having rotatable connection with the clutch head and endwise movable transversely of the frame, and a relatively fixed cam of which the body is the follower.

WILLIAM F. H. BRAUN.